United States Patent

[11] 3,558,856

| [72] | Inventors | Willis Thompson Lawrence<br>Winchester;<br>George Warren Webb, Revere, Mass. |
|---|---|---|
| [21] | Appl. No. | 839,129 |
| [22] | Filed | May 23, 1969<br>Division of Ser. No. 682,192,<br>Nov. 13, 1967, Patent No. 3,475,596. |
| [45] | Patented | Jan. 26, 1971 |
| [73] | Assignee | Hooker Chemical Corporation<br>Niagara Falls, N.Y.<br>a corporation of New York. by mesne assignments |

[54] USE OF HEATED LEG
5 Claims, 2 Drawing Figs.

[52] U.S. Cl................................................. 219/492,
219/325, 219/378
[51] Int. Cl............................................... H05b 1/02
[50] Field of Search.......................................... 219/282,
320, 321, 483, 484, 486, 417, 511, 325, 378, 326,
445, 302, 540, 413, 492; 165/18; 126/400

[56] References Cited
UNITED STATES PATENTS

| 1,607,393 | 11/1926 | Derby............................. | 219/326X |
| 2,640,906 | 6/1953 | Haynes........................... | 219/445 |
| 2,856,506 | 10/1958 | Telkes............................ | 219/302X |
| 3,356,834 | 12/1967 | Mekjean......................... | 219/540 |

FOREIGN PATENTS

| 272,767 | 6/1927 | Great Britain................ | 219/413 |

*Primary Examiner*—Bernard A. Gilheany
*Assistant Examiner*—F. E. Belu
*Attorneys*—Peter F. Casella, Raymond F. Kramer and Richard K. Jackson

ABSTRACT: An independent leg heater is disposed in a heat storage material to melt some of the material and provide an escape channel for the bulk of said material as it liquefies. Special heater circuitry provides for the regulation of heating periods for the independent leg heater (1) to apply heat automatically prior to activation of the main heating elements, (2) to stop the application of heat when the heat storage material is molten to prevent overheating in the upper region of the storage material surrounding the leg heater, (3) to shut down the entire system if the leg heater fails to operate.

3,558,856

USE OF HEATED LEG

This application is a division of application Ser. No. 682,192 filed Nov. 13, 1967 now U.S. Pat. No. 3,475,596.

BRIEF SUMMARY OF THE INVENTION

This invention relates to an apparatus which may be used in heat storing material that passes from a solid to a liquid state during an operation cycle. More specifically, this invention deals with a means for alleviating the production of high pressures within a vessel housing a heat storage medium which is converted from the solid to the liquid state when heat is introduced for storage. When heat is applied to a solid which is held in a container, uniform heating throughout the solid material results in the even liquefaction of the solid. The homogeneous liquefaction of a solid, which has space for expansion results in the production of no adverse internal pressure within the container. However, it is generally impractical to apply a uniform heat to all parts of a tank of solid heat storage material. In actual practice, one or more heating elements are disposed within a container at the time the molten heat storage material is initially introduced into the container. The molten material is allowed to solidify and the tank of solid heat storage material is then transported to the installation site. The heating elements (main heaters) may be of the type which have a broad flattened spiral near the bottom of the tank of heat storage material to provide maximum heating capacity near a heat transfer coil and to produce convection circulation within the molten heat storage material.

When the main heater elements are actuated, initially or during any cycle in which the heat storage material has been allowed to solidify, a large amount of heat is supplied to the storage material at localized points throughout the matrix of the solid material. This localized heating melts the solid in pools contained within the rest of the solid storage material. As the solid melts, it expands, producing internal pressures which are large enough to distort the shape of the container.

Alkali metal hydroxide compositions are preferred heat storage media because of their high heat storage capacities. Other attributes of alkali metal hydroxide compositions which make them especially adaptable as heat storage media are their high heats of fusion, broad operative temperature ranges, relative inertness and low vapor pressure.

The alkali metal hydroxide compositions are superior to previously used heat storage media that depend upon heat of crystallization rather than heat of fusion for their heat storage capacity. However, due to the wide temperature ranges applicable to heat storage in alkali metal hydroxide compositions, special problems occur which require the development of novel apparatus to prevent distortion of the various elements of the storage unit when the solid heat storage material is melted.

The alkali metal hydroxides themselves have melting points which range from about 522° F. for cesium to about 842° F. for lithium. The incorporation of additives such as corrosion inhibitors and nonreducing agents into the alkali metal hydroxide heat storage compositions affords mixtures with different melting points.

Sodium hydroxide compositions normally contain solids up to within the range of about 450°—650° F. The liquid begins to form at about 450° F. providing a solid-liquid mixture up to about 650° F. During the heat storage cycle, the sodium hydroxide composition may be heated to temperatures as high as about 1,250° F. Normal operating conditions range from about 200°—900° F.

It is an object of this invention to equalize pressures developed in an unevenly heated heat storage material.

It is a further object of this invention to provide an escape channel for the liquid heat storage material within the solid heat storage material to avoid the development of internal pressure from uneven heating.

It is a further object of this invention to provide an electrical circuit to regulate the operation of heating elements used to heat alkali metal hydroxide compositions for heat storage.

It has been discovered that an escape channel may be provided for the melting heat storage material in the region of maximum heating by the main heating elements. This escape channel may be formed by providing a heated length with one or more of the main heater elements or preferably by a heater leg operating independently from the main heating elements. The independent heater leg extends between the area of maximum heat provided by the main heating elements and the top of the heat storage material. Above the heat storage material is provided space for expansion within the containing vessel. The independent leg heater melts a channel through the heat storage material to allow the liquid media melted by the main heating elements to escape, thereby relieving the pressures and stresses which develop from a contained liquid as it expands from the solid phase.

Furthermore, a control system has been discovered to provide for safe startup and operation of heat storage apparatus employing an independent heater leg. The control system provides the following features:

1. A time delay circuit which permits the leg heater to operate for a fixed period of time before the totally immersed main heaters are actuated.

2. Means for turning off the independent leg heater when the heat storage material is completely molten to prevent overheating of the material at the top of the heat storage tank and to prevent excessive corrosion of the heater sheath. For example, this control feature is necessary if an independent heater leg 30 inches or more in length is vertically placed in THERMKEEP (an alkali metal hydroxide, alkali metal nitrate mixture with a corrosion inhibitor) and the heater watt density is greater than about 25 watts per square inch.

3. A means for shutting down the entire system if the leg heater fails to operate.

DETAILED DESCRIPTION OF THE INVENTION

The invention can best be understood by reference to the accompanying drawings.

Figure 1:
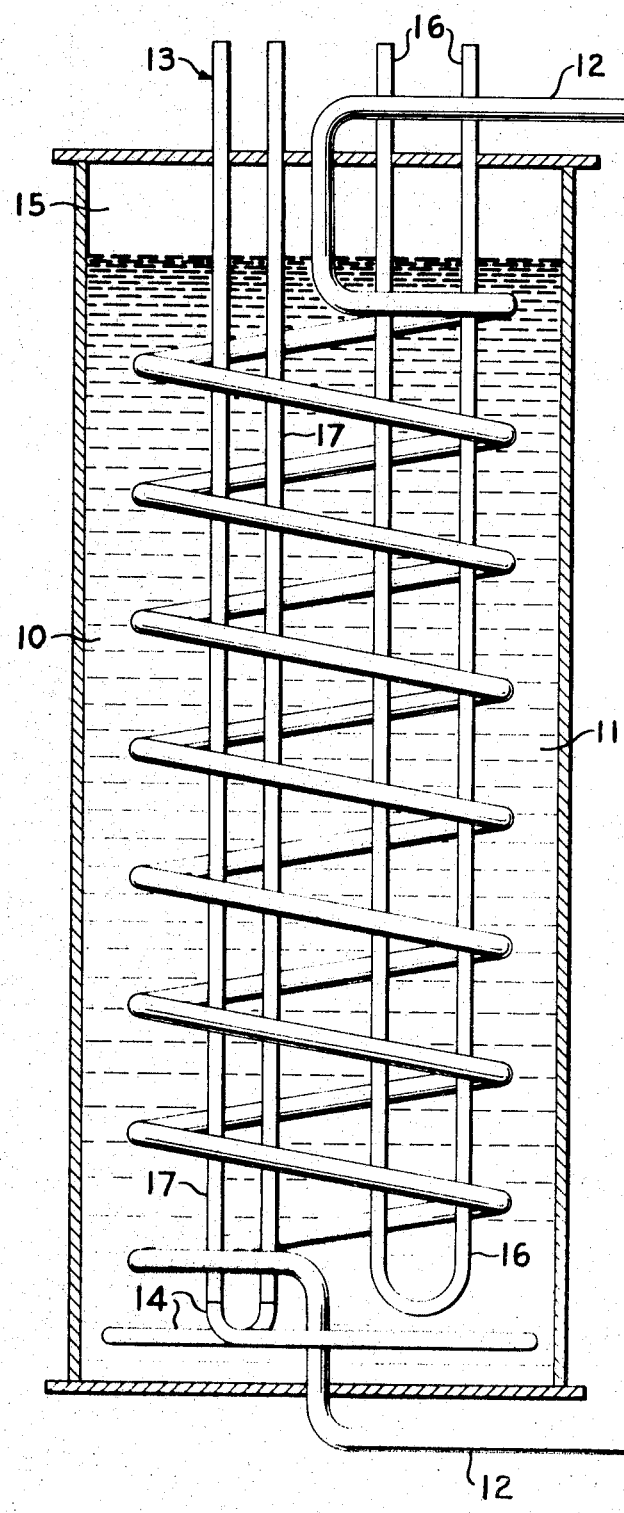

FIG. 1 presents a diagrammatic view of a tank of alkali metal hydroxide composition with a main heater and an independent leg heater disposed therein.

Figure 2:
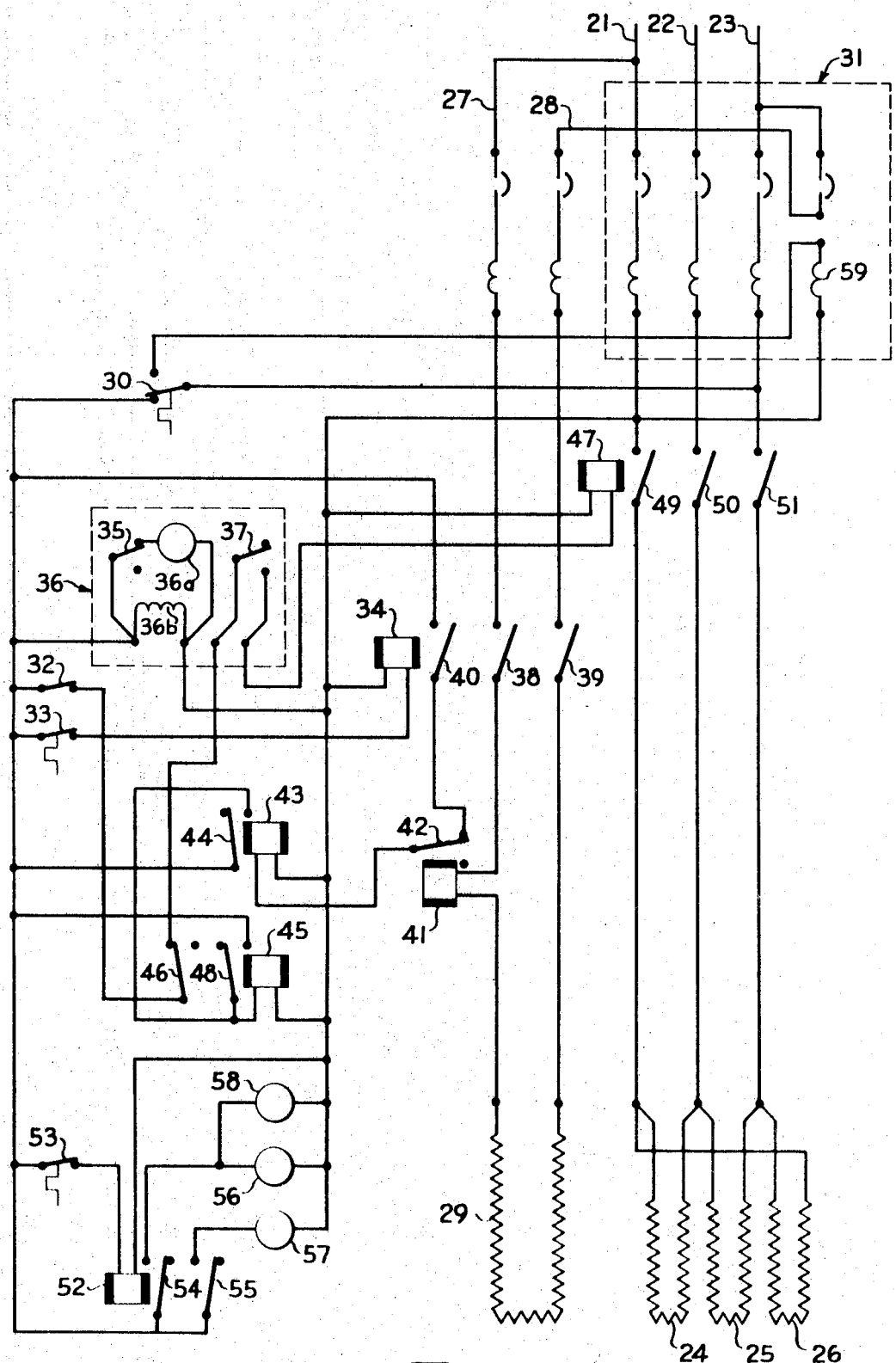

FIG. 2 presents the circuitry applicable to the operation of the heat storage container heating elements of this invention.

In operation, FIG. 1 presents a heat storage container 10 housing a heat storage medium 11 which operates on the heat of fusion principle. An expansion space 15 is provided above the heat storage material within the heat storage container. The main heater element 13 provides heat at 14 in the lower region of the heat storage medium. An unheated portion 17 of the main heater element 13 extends from the electrical connector to the resistance heater portion 14. A conduit 12 for a heat transfer medium traverses the heat storage medium 11. An independent leg heater 16 is disposed within the heat storage medium, providing a heated section extending from the expansion space 15 to the region of maximum heat provided by main heater 13 and 14.

The independent leg heater 16 is activated at the time the heat storage material is initially melted from the solid, at any time during normal operation when the heat storage material is being solidified and at any time during the use of the heat storage material after a power loss has been experienced. It is necessary to activate the independent leg heater before activating the main heaters after a power loss, whether the heat storage material has solidified or not, to avoid additional sensing devices which would determine whether solidification had occurred.

After the activation of the independent leg heater 16, a time delay means activates the main heating element 13. The time delay means provides sufficient time of operation for the independent leg heater to melt a channel from the expansion space 15 above the heat storage medium 11 to the region of maximum heat of the main heater element at 14. Thus, the heat storage material melted by 14 expands through the channel provided by the independent leg heater.

When more than one main heater element is disposed in the heat storage material, an independent leg heater may be provided to melt a channel for each main heater, or a single independent leg heater may be disposed to provide a channel through which heat storage material melted by a plurality of main heater elements may escape.

In FIG. 2, lines 21, 22 and 23 represent the main power source which activates the main heater elements 24, 25 and 26, depicted as 10 kilowatt resistance heaters, disposed in the heat storage material. Lines 27 and 28 represent the power source which activates the independent leg heater element 29, depicted as a 4 kilowatt resistance heater, disposed in the heat storage material. Switch 30 is a protective temperature control switch which opens the main circuit breaker 31 by applying a full current load to coil 59 when the temperature of the molten heat storage material rises above a point set in control switch 30.

When power is first put across lines 21, 22 and 23, if switches 32 and 33 are closed, power contactor 34 is activated causing current to flow through the heater element 29. Current also flows through switch 35 activating the time delay circuit 36 which controls switches 35 and 37. The motor 36a and magnetic clutch 36b effect the timer operation of circuit 36.

When switch 33 is closed, activating power contactor 34 and closing its contacts 38, 39 and auxiliary contact 40, current flows through relay 41 closing it. The closing of relay 41 opens contacts 42 preventing time delay relay 43 from being activated.

If current does not flow through heater 29, relay 41 does not operate. Thus, contact 42 remains closed and 43 is activated. When time delay relay 43 is activated, it closes switch 44 energizing relay 45. Contacts 46, which are normally closed, will open when relay 45 is energized to prevent activation of 47, and the closing of contacts 49, 50 and 51, while normally open contacts 48 close, locking 45 in this position.

If the heat storage material is used to heat the water in a water tank, 52 is a relay associated with the control system of the water tank, 53 is the thermostat-controlled by a bulb in the water tank. 54 and 55 are contacts which when closed activate motors 56 and 57 and the solenoid valve 58. Motor 56 operates a pump that will inject water into a boiler coil disposed within the heat storage material. Motor 57 drives a circulation pump to maintain even temperatures within a water tank associated with heat storage material. Solenoid valve 58 opens and closes a bypass around the injection pump.

In the following examples, reference is made to the control circuit of FIG. 2.

EXAMPLE I

At the time of initial start-up, when the heat storage material is in the solid state, or at any time when heat is to be supplied to the heat storage material after a power interruption to the system (this interruption could be planned as with a time clock or accidental) the control circuit functions in the following manner:

An external switch (not shown) is closed to provide power to lines 21, 22 and 23. Current flows through the circuit formed by closed thermostat-controlled switch 33 activating the power contactor 34, thereby activating heater leg 29 and the time delay circuit 36. During the initial heating period of the storage material, the time delay circuit switches 35 and 37 are in the position shown in FIG. 2. After the desired time interval, switches 35 and 37 are changed to their alternate positions by the timer. The closing of 37 activates 47 and completes the circuit for main heaters 24, 25 and 26 via contacts 49, 50 and 51.

EXAMPLE II

During normal operation, switch 32 is set to open at any desired maximum temperature and to close at some predetermined temperature. The main heater elements 24, 25 and 26 are controlled by the temperature control switch 32 and the leg heater 29 is controlled by temperature control switch 33 without a time delay. As long as the power to the unit remains uninterrupted, the motor 36a and clutch 36b maintain 35 and 37 in the time delay circuit in the open and closed positions, respectively.

After the heat storage material is molten, the power to the independent leg heater 29 is cut off by opening the thermostatically controlled switch 33. This is accomplished by setting the thermostat for switch 33 at any desired value less than the temperature for thermostat switch 32 and greater than the solidification temperature of the storage material. For an alkali metal hydroxide composition having a solidification temperature near 540° F. the thermostat controlling 32 may be set at 900°, while the thermostat controlling switch 33 is set at 750° F. Hence, the independent heater leg will be dropped from the circuit at 750° F. while the main heaters raise the temperature of the storage material to 900° F.

EXAMPLE III

As a safety device, if the leg heater fails to operate, means for deactivating the main heater elements 24, 25 and 26 are provided as follows:

Under normal operation of the leg heater, when the thermostat contacts 33 close, activating 34 which closes 38, 39 and auxiliary contact 40, current will flow through the current-sensitive relay 41. The activating of 41 opens contacts 42 thereby preventing the time delay relay 43 from being activated.

If the leg heater fails to work, contacts 42 remain closed and the closing of 40 energizes relay 43. If no current flows through 41 at the end of a predetermined period (1—10 seconds) time delay relay 43 operates closing 44 and thereby energizes relay 45. Normally closed contacts 46 open, preventing the activation of 47, while normally open contacts 48 close, locking 45 in this position. Thus the main heater contactor cannot be activated without first shutting off the power at the main heater circuit breaker or at lines 21, 22 and 23 to release 45. On reactivating the system it will again close down if the leg heater still does not function.

EXAMPLE IV

Other important aspects of the control circuit presented in FIG. 2 are:

1. 30 is the high limit temperature control. It may be set at a temperature about 50° F. above the maximum desired temperature of the heat storage material. If any feature of the circuit fails to maintain the temperature at the desired maximum temperature and the temperature rises by the amount set in 30; i.e. 50° F., 30 assumes the position not shown in the drawing, applying a full current load across coil 59 which opens the main circuit breaker.

2. 52 is a relay associated with the control system on a water tank in which the water may be heated by the heat stored in the heat storage material.

3. 53 is a thermostat controlled by a bulb in a water tank, referred to under preceding part (2). When the temperature falls below the desired level 53 closes energizing 52. Contacts 54 and 55 close, activating motors 56 and 57 and solenoid valve 58 which is normally open.

4. 56 drives a pump which injects water into a boiler coil disposed within the heat storage material.

5. 57 drives a circulating pump which maintains a uniform temperature within a water tank to which heat is to be supplied.

6. 58 opens and closes a bypass around the injection pump which permits water to drain from the boiler coil when the pump is not being operated.

Having disclosed my invention it will become apparent to those skilled in the art that obvious modifications of my invention may be made which do not depart in spirit from this disclosure. For example, the two circuit breakers as presented in the accompanying drawing may be replaced by a single five-pole manually set electrically tripped circuit breaker.

Likewise, a stepdown transformer may be disposed between the control circuit and the heater lines so that the controls may be operated on a lower voltage than is supplied to the heater elements. Likewise, coil 59 on the main circuit breaker could be omitted. In this case high temperature limitation would come solely from breaking the circuit by manually reset thermostat 30. Likewise, different applications may require other elements than thermostat 53, solenoid valve 58, motors 56 and 57 and relay 52.

We claim:

1. In a system for the regulation of heating between a leg heater and a main heater disposed in heat storage material, the improvement comprising a main heater element, an independent leg heater element, a controlled source of energy activating said heating elements, energy heater elements programming the activation of said heating elements by providing for the sequential activation of said main heater element after the expiration of a predetermined time delay from the activation of said independent heater leg, temperature-sensitive control means connected between said independent leg heater element and said energy source deactivating said leg heater element when the temperature of said heat storage material exceeds a predetermined value, temperature-sensitive control means controlling the thermal output of said main heater element connected between said main heater element and said energy source, and protective control means for retaining said main heater element in an inactive mode by preventing connection of said main heater to said energy source in event said heater leg is not actuated after a predetermined time delay.

2. The improvement of claim 1 wherein said energy source is a source of electric energy and said control means are electrical switching means.

3. The improvement of claim 2 wherein said control means programming the activation of said heater elements comprises a time delay circuit and bistable electrical switching means arranged in parallel with said time delay circuit providing for the flow of current through one side of said time delay circuit until directed to the other side of said time delay circuit by the lapse of a predetermined period of time, said time delay circuit being connected to initially activate said independent leg heater element and, after the lapse of a predetermined period of time, to activate said main heater element.

4. The improvement of claim 3 in which said switching means arranged in parallel about said time delay circuit are controlled by heat-sensing transducers programmed to open the power circuit to the independent leg heater element at a predetermined temperature about the melting point of said heat storage material and below the temperature at which the power circuit for the main heater element opens in response to its control.

5. The improvement of claim 4 in which said protective control means comprises current-sensitive switching means connected in the independent heater leg activating circuit, said current-sensitive switching means being connected to time delay switching means controlled by latching circuit means connected in the activating circuit of the main heater element to retain the said main heater element in an inactive mode in event current does not flow through said independent heater leg element within the time delay period of said time delay switching means.